United States Patent [19]

Mutschler et al.

[11] Patent Number: 4,472,668

[45] Date of Patent: Sep. 18, 1984

[54] MULTI-LEAD COMPONENT MANIPULATOR

[75] Inventors: Thomas A. Mutschler; Arthur C. Sanderson; Lee E. Weiss, all of Pittsburgh, Pa.

[73] Assignee: Westinghouse Electric Corp., Pittsburgh, Pa.

[21] Appl. No.: 461,799

[22] Filed: Jan. 28, 1983

[51] Int. Cl.³ .............................................. G05B 19/42
[52] U.S. Cl. .................................... 318/568; 318/640; 294/86 R; 414/730
[58] Field of Search ............. 318/568, 640; 294/86 R; 414/730; 250/491

[56] References Cited

U.S. PATENT DOCUMENTS

| | | | |
|---|---|---|---|
| 4,260,187 | 4/1981 | Frosch | 318/640 X |
| 4,368,913 | 1/1983 | Brockmann et al. | 294/86 R |
| 4,423,998 | 1/1984 | Inaba et al. | 414/730 |

FOREIGN PATENT DOCUMENTS 2058714 4/1981 United Kingdom ............ 294/86 R

Primary Examiner—B. Dobeck
Attorney, Agent, or Firm—T. R. Trempus

[57] ABSTRACT

A multi-lead component manipulator for the assembly of circuit boards has optical and tactile feedback systems and includes at least two and preferably three symmetric assemblies radially disposed about a component gripper assembly. Each symmetric assembly has a movable lead guide means for engaging a component lead and aligning the same for circuit board insertion. The guide means are adapted for independent arcuate and radial motion reflective of the optical feedback system and the gripper assembly is capable of axial movement for the acquisition and insertion of components. The tactile feedback system controls component insertion. The manipulator in an alternative embodiment has fixed guide means disposed above the movable guide means. The fixed guide means orient the component leads for acquisition by the movable guide means.

9 Claims, 7 Drawing Figures

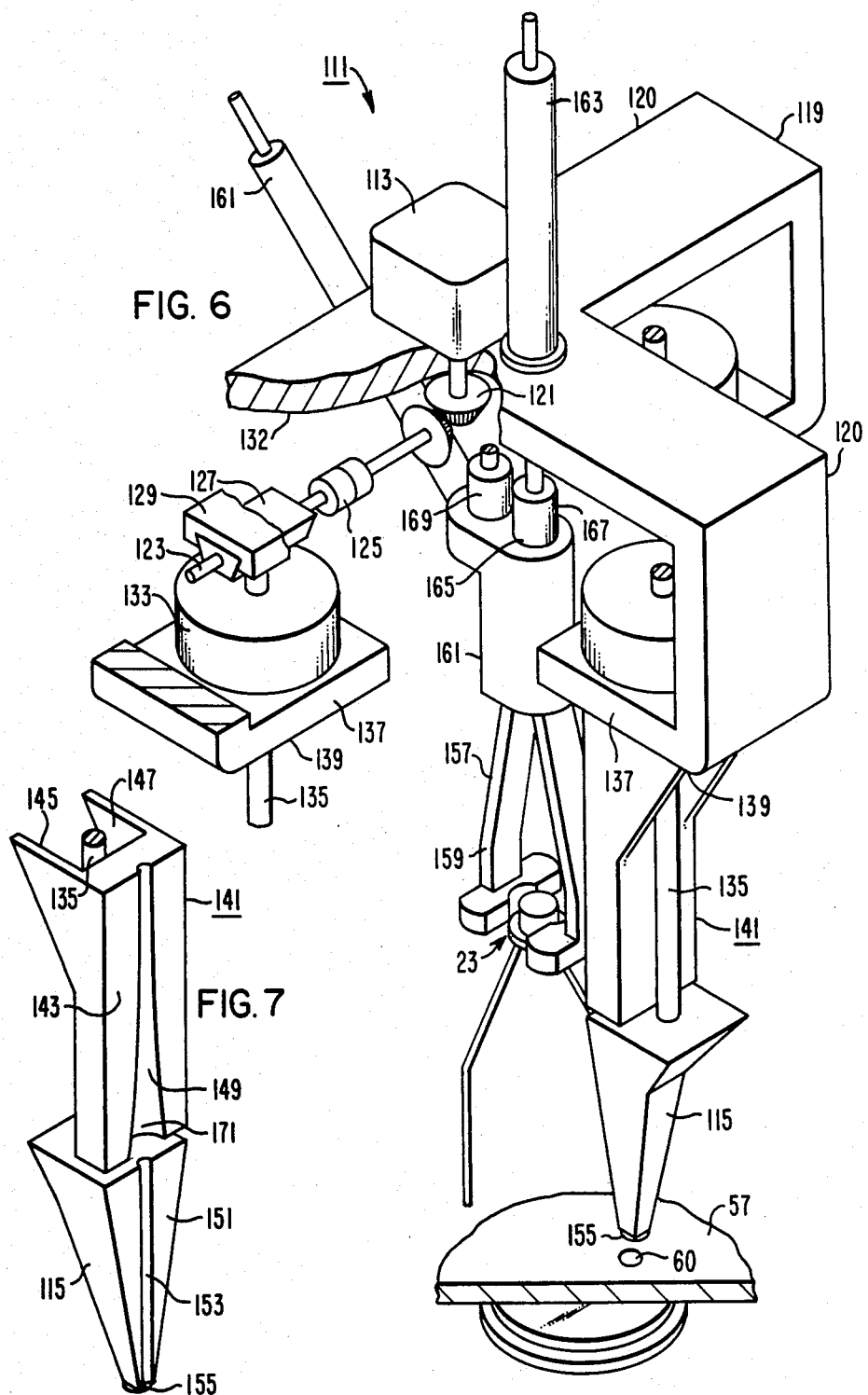

MULTI-LEAD COMPONENT MANIPULATOR

BACKGROUND OF THE INVENTION

The invention relates to an end effector for an industrial manipulator, particularly those manipulators employed in the area of circuit board assembly.

It is a general practice to assemble electrical components of low production volume, high component density, printed circuit boards by hand. It is an industry wide objective to introduce computer controlled robotic manipulators into the aforedescribed manufacture of circuit boards. Such robotic manipulators provide more accurate assembly and production flexibility which will ultimately lower the costs of manufacturing specialized circuit board assemblies.

A common limitation encountered in the use of industrial manipulators, however, is the ability of the robot to handle and insert component parts, particularly multi-lead components. Another difficulty encountered in printed circuit board assembly is the insertion of compliant parts into the circuit board. In the automated handling of rigid parts, knowledge of the shape of each part is sufficient to predict the positions of all aspects of the part. Therefore, once the part is acquired in a known orientation, repositioning the acquired part for assembly is a straightforward task. Compliant parts, such as resistors, transistors and the like, are more difficult to handle in assembly operation since the component leads can deform during handling and under the forces applied during assembly.

It is therefore an object of this invention to provide an end effector for an industrial manipulator which grasps the body of a multi-lead component and manipulates the compliant leads of the component.

It is also an object of this invention to provide a multi-lead component gripper which has a fixed guide means for orienting the component and its leads.

SUMMARY OF THE INVENTION

The invention is a multi-lead component manipulator for printed circuit board assembly by an industrial manipulator. The component manipulator includes a frame member with a gripper centrally disposed thereon and at least two assemblies radially disposed about the gripper. Each assembly includes a component lead guide means which engages the component lead for the manipulation and control thereof during component insertion. The lead guide means are movable both radially toward and away from the gripper and arcuately relative to the gripper. Motive, means are provided to effect the radial and arcuate movement of the lead guide means and the axial movement of the gripper means. Both optical and tactile feedback are incorporated into the manipulator and provide output signals reflective of component orientation to a sensor in a predetermined position. The invention also includes fixed guide means for orienting the component and its leads prior to the engagement of the movable lead guide means.

BRIEF DESCRIPTION OF THE DRAWINGS

The above as well as other features and advantages of this invention will become apparent through consideration of the detailed description in connection with the accompanying drawings in which:

FIG. 6 is an alternative embodiment of a multi-lead component manipulator with fixed lead guides and portions cut away to more clearly illustrate its features; and FIG. 7 is a perspective view of a fixed lead guide and a movable lead guide of the alternative embodiment of FIG. 6.

DETAILED DESCRIPTION OF THE INVENTION

Figure 1:
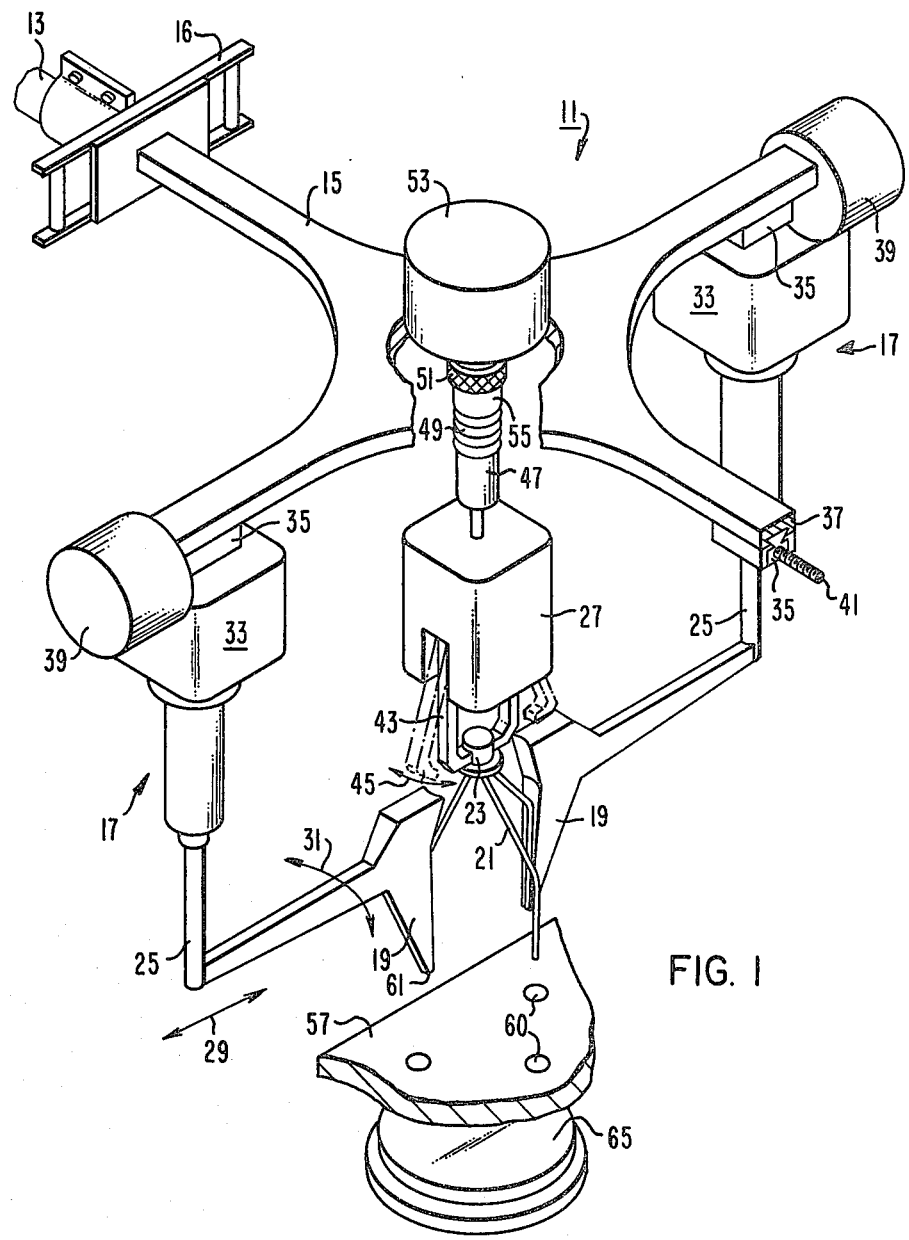
FIG. 1 is a somewhat schematical illustration of a multi-lead component manipulator with portions cut away to more clearly distinguish its features.

An apparatus for the acquisition, alignment and insertion of a multi-lead component into the appropriate mounting holes of a printed circuit board is illustrated in FIG. 1 and is generally designated by the reference character 11. The apparatus or manipulator device 11 is designed for use with a computer controlled industrial manipulator and is mounted onto the movable arm 13 of such a device by means of a mounting plate 15. A compliant device 16 is typically disposed therebetween. The manipulator device mounting plate 15 additionally functions as a frame member which supports the individual structural components of the manipulators device 11. At least two and preferably three radially disposed, symmetric assemblies 17 are associated with the mounting plate 15. It is to be appreciated that while the use of two symmetric assemblies permits the manipulation of two lead components such as resistors and capacitors, three symmetric assemblies make it possible to manipulate both two lead components and three lead components such as transistors. Of course, more than three symmetric assemblies can be incorporated into a manipulator device according to the present invention. Each symmetric assembly 17 includes a component part lead guide means 19 which engages a lead 21 of an electronic component 23. The lead guide means 19 is supported by an arm 25 capable of radial movement toward and away from the component gripper assembly 27 and arcuate movement as indicated by arrows 29 and 31 respectively. The arcuate motion of the arm 25 is effected by a motive means such as a servo-galvanometer 33 capable of accurately generating such motion. The servo galvanometer 33 is supported from a slide member 35 which travels along a guide means 37 provided in the mounting plate 15. Motive means such as a radial linear displacement servometer 39 provides incremental movement to the slide member 35 through a geared drive shaft 41. Thus, the lead guide means 19 as supported by the arm 25 is manipulated both radially and arcuately to effect component lead 21 acquisition and alignment. The radial and arcuate movement of the arm can be effected either individually or simultaneously as will be hereinafter more fully described.

The gripper assembly 27 includes fingers 43 which engage and grip the electrical component 23 to be manipulated. The fingers 43 are movable from a closed position to an open position as shown in dash-dot lines and indicated by the directional arrow 45. The fingers 43 are actuated by a gripper piston 47 which preferably is pneumatically operated. The gripper piston 47 and gripper assembly 27 is supported by a compliant device 49 such as a flexible motor shaft coupling. The compliant device 49 provides a degree of flexibility to the manipulative operation of the gripper assembly 27 in order to facilitate component lead alignment and lead insertion into the printed circuit board.

The compliant device 49 is both supported by, and vertically manipulated relative to the mounting plate 15, by the shaft 51 of a motive means 53 such as a linear displacement servomotor. The servomotor 53 can be responsive to a transducer 55 disposed between the compliant device 49 and the shaft 51 or remotely actuated. The transducer 55 provides tactile feedback to the servomotor 53 primarily during the insertion of the component into the circuit board 57.

Figure 2:
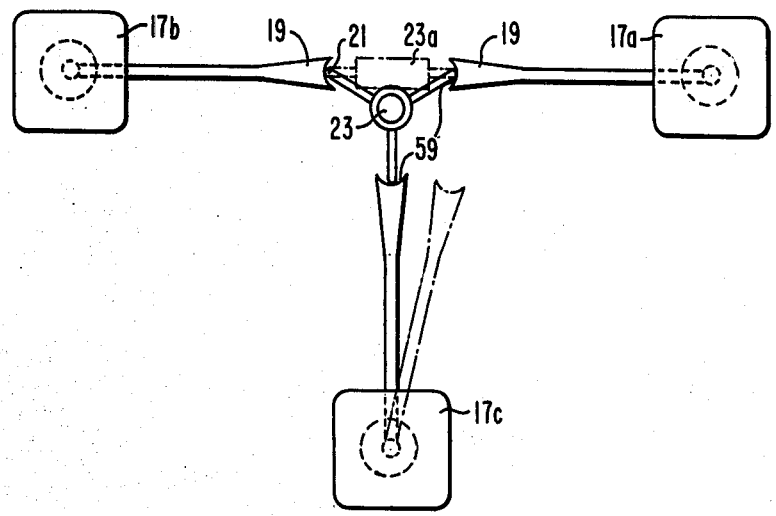
FIG. 2 is a diagrammatic illustration of the radial and circumferential displacement motion generated during the operation of this component manipulator.

In FIG. 2, the symmetric assemblies 17 of the manipulator device 11 schematically illustrate both the radial and arcuate movement associated with a three lead component shown in full and a two-lead component shown in dash-dot. Considering first a three-lead component 23, it can be seen that the lead guide 19 of each assembly 17a through c has a concave seating surface 59 which engages a component lead 21. The concave surface 59 tends to retain the lead so that positive adjustments to the lead can be effected through arm movement. If a two-lead component 23a is being manipulated, only assemblies 17a and 17b are utilized. Assembly 17c can be retracted from the component and/or positioned to the side of the component. (Both the two-lead component and the position of the assemblies during two-lead component manipulation are shown in dash-dot line).

The combination of independent radial and arcuate movement in each assembly 17 allows a single manipulator device according to this invention to be utilized for a variety of component applications. Thus, a single station industrial manipulator can effectively and efficiently be utilized in the fabrication of a printed circuit board requiring components having various lead configurations.

The actuation of the motive means to effect the manipulation of the assemblies 17a, 17b and 17c can be accomplished through the use of several methods. For example, a computer control system can be programmed to generate a series of commands necessary to accomplish a desired task with the subject component manipulator. Such a system is ideally suited for repetitive tasks. The actuation of the motive means can alternatively be controlled through optical and tactile feedback systems built into the manipulator. The optical and tactile feedback features are provided herein as an exemplar and it is understood that other methods of actuating the motive means, as suggested above, can be utilized with the present invention.

Figure 3:
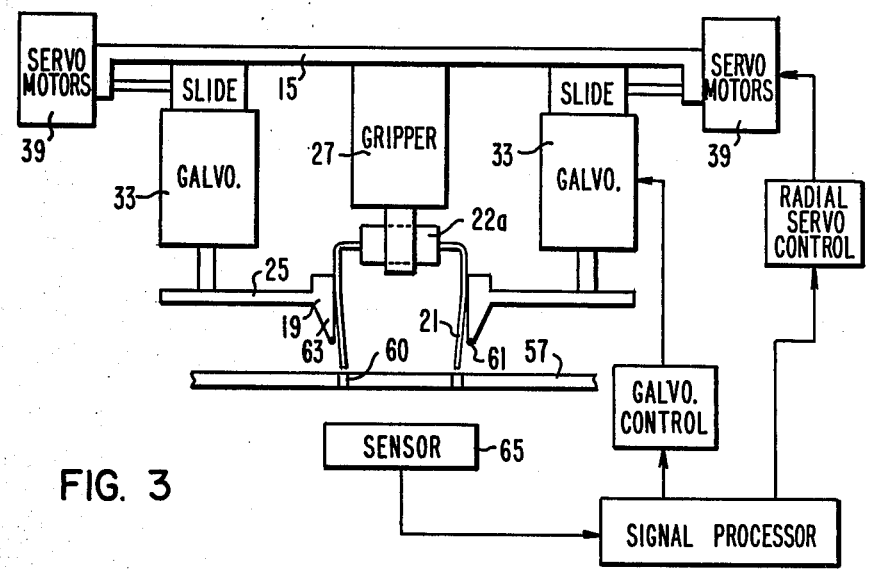
FIGS. 3 and 4 are schematic illustrations of an optical feedback system.

The optical and tactile feedback features are described in connection with FIGS. 3, 4 and 5. As previously indicated, the arrangement of the servomotor 39 and the galvanometer 33 in each assembly 17 allows controllable motion of the component leads in two directions. Through cooperation with the optical feedback system, somewhat schematically illustrated in FIG. 3, the aforementioned motive means 33 and 39 are capable of "homing" in on the center of the hole 60 of the printed circuit board 57 through which the lead is to be inserted.

The optical feedback system includes an IR photoemitter 61 located in the lower portion 63 of the finger 19. A photodiode detector 65 is positioned below the circuit board 57 so that the coordinated relationship exists between the hole into which the component lead is to be inserted and the photodiode detector 65. In one configuration, for example, the photodiode detector 65 is mounted in a fixed position and the circuit board 57 is supported in a movable framework which positions the circuit board relative to the photodiode detector 65 for each component insertion task. The emitter 61 output passes through the lead hole 59 of the circuit board onto the photodiode positioned below the hole 59. The emission of emitter 61 contacting the photodiode detector 65 is converted to a voltage output signal which is a function of the degree of the emission passing through the lead hole 59. The output voltage signal is at its maximum level when the emitter 61 and thus component lead 21, is centered over the hole 59. The voltage output level functions as a control signal to the servomotor 39 and the servo-galvanometer 33.

Generally, the detection of one hole in a circuit board can be accomplished with one source of light and one detector. However, the sensing of multiple holes as required in the multiple lead gripper presents these unique obstacles: the region of interest is generally too small to easily align the several detectors necessary, and the separation of the signals of each emitter would be minimal. It is possible to sense the relative positions of each lead of a multi-lead component by a time division multiplexing system. Time division multiplexing would obtain a voltage output signal from one detector with one light source activated, retain the output information, and the sample a second detector with a second light source activated. This process continues until each output is obtained so that a corrected position is generated and the motive means which position the fingers of the manipulator actuated.

It is preferred that the optical feedback system consist of a multi-channel position detection system utilizing frequency division multiplexing wherein a continuous output signal is provided and potential errors created by noise due to ambient light are substantially eliminated.

Frequency division multiplexing involves modulating each of the light sources such that the light beam has an intensity of the form A cos 2πf(t). The three beams have independent alternation and are all collected with the same detector. For an alternation $f(r_i)$ of the ith source, the detector output is:

$$\sum_{i=1}^{3} (r_i) \cos 2\pi f_i(t); \text{ where } i = 1$$

The functional dependence is contained in the amplitude, thus readily enabling the separation of the light from both DC and 60 Hertz noise. A simple high pass filter removes the effects of ambient light and AC line noise.

There are several methods by which channel separation can be effected, examples of which include the uses of bandpass filters and the demodulation of the channels through the use of multipliers. The preferred embodiment incorporates multiplying the detector output by the carrier frequency for synchronous detection. This is made clear by considering the detector output as several AM waves and the trigonometric statement:

$$\cos(A)\cos(B) = \tfrac{1}{2}\cos(A-B) + \tfrac{1}{2}\cos(A+B)$$

The multiplication of the detector output with the carrier yields a term proportional to $f(r_i)$ and a term that involves the sum and difference of the carrier and the jth components of the detector output where $j \neq i$. The unwanted terms can be eliminated using a bandpass filter.

Synchronous detection using a multiplier yields an acceptable signal to noise ratio, a high immunity over oscillator frequency drift and an improved time domain response when compared to a bandpass system.

Figure 4:
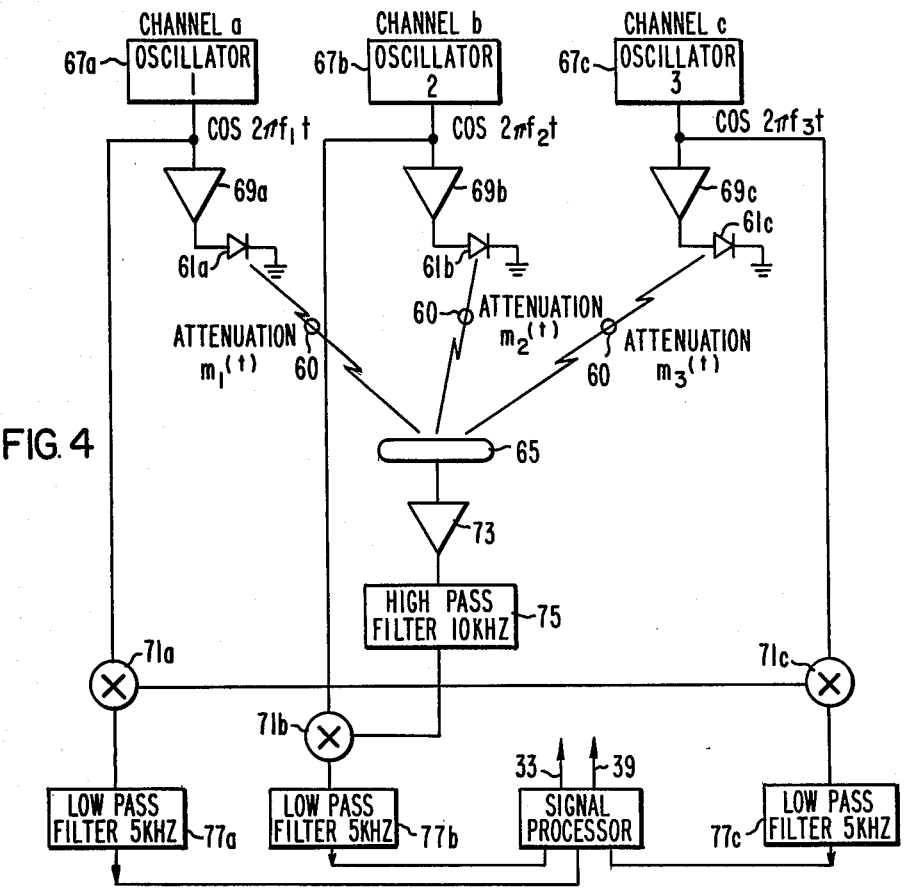
Figure 5:
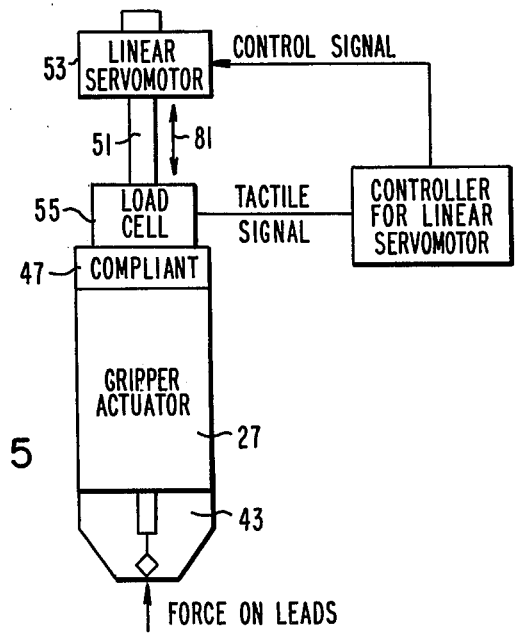
FIG. 5 is a schematic illustration of a tactile feedback system.

Turning to FIG. 4, a multiplier demodulation system is schematically illustrated in a three lead component manipulator, as previously described in association with FIG. 1. The actual channel frequencies selected for the demodulation system may vary; accordingly, the values presented herein should be viewed as an example of a demodulator system according to this invention. The channel frequencies of the illustrated embodiment were chosen to be 40, 50 and 60 KHz for channels "a" through "c" respectively. In order to satisfy the constraints of channel bandwidth and message bandwidth, device frequency is limited herein to below a 100 KHz bandwidth. The message bandwidth is assumed to be 1 KHz, thus allowing a channel bandwidth of at least 2 KHz. (A 1 KHz message bandwidth allows quick response to position movements. The channel bandwidth of 10 KHz allows the use of first and second order filters to obtain good separation. The bandwidth provides a safety factor in the unlikely event that a channel oscillator should drift.

Channel "a" includes an oscillator 67a which provides a signal of a first preselected frequency to the emitter driver circuit 69a and the multiplier 71a and an 1R emitter 61a. Channel "b" includes an oscillator 67b which provides a signal of a second preselected frequency to the emitter driver circuit 69b and multiplier 71b, and an 1R emmitter device 61b. Channel "c" includes an oscillator 67c which provides a third preselected frequency to the multiplier 71c and the driver circuit 69c and includes a 1R emitter 61c. The photodiode detector 65 is positioned below the circuit board at a predetermined component part location. An amplifier circuit 73 and a high pass filter 75 convey the signal detected by the photodiode detector 65 to the three multipliers 71a through c. Each multiplier 71a-c and its associated low pass filter 77a-c generates an output signal reflective of the degree of attenuation, if any, resulting from the positional relationship of the circuit board lead holes 60 with the emitter output. A signal processor 77 converts the output signal into input signals utilized by a servomotor control circuit and a galvanometer control circuit in order to effect positional adjustment of the manipulator fingers.

The use of frequency division multiplexing allows the simultaneous position measurement of several independent relative motions.

After the component leads have been moved into position, the component is pushed into place so that each lead 21 is inserted into the proper hole of the circuit board. This task is accomplished by the motive means 53 which is controlled by a tactile or force feedback system which is schematically illustrated in FIG. 5. The motive means 53 effects axial displacement of the gripper toward and away from the frame member 15 as indicated by arrow 81. The transducer 55 is a piezoelectric load cell which outputs a voltage in response to the changes in axial force on the component leads during insertion. The dynamic response of this signal is rapid enough to prevent the bending of the component leads in the event of leadhole non-alignment. Additionally, the transducer is sensitive enough to provide a force signal in response to the frictional forces generated in the guides of the fingers 19 and in the holes 60 of the circuit board. The frictional signal and position information obtainable from the linear servomotor 53 provide information which is sufficient to verify that the component is properly inserted in the circuit board 57.

It is possible to facilitate compliant lead insertion into a circuit board hole through vibration-assisted manipulation of the component and/or the circuit board. Vibrational or impulsive forces can be applied during assembly in order to release deformations of the compliant component parts introduced by frictional faces during assembly. A white norse generator, for example can be incorporated into the circuit board support structure to induce vibration into the circuit board during assembly as necessary. Another technique is impulsive force created by the subtle movement of the component relative to the circuit board in a predetermined series of movements effected either by the manipulator itself or by the circuit board support structure. Tactile feedback is used to control the added vibrational force which can improve control over both lead shape and lead position.

Turning to FIG. 6, an alternative embodiment of the manipulator device is generally indicated by the reference character 111. In addition to using several of the features described with the first embodiment of this invention, several unique features are incorporated into this alternative embodiment. It will become apparent that although only two embodiments are set forth herein in detail, the particular features of each embodiment are not exclusive thereto, and modifications to each embodiment are possible through various combinations of such features. For example, the manipulator device 111 utilizes a single motive means 113 to effect the radial displacement of the movable guide means 115, rather than the three independent motive means which provide radial displacement for the finger like guides of the first embodiment.

The manipulator device 111 has a housing like, frame member 119 which is adapted for attachment to the arm of an industrial manipulator (not illustrated herein). The frame member 119 supports the radial motive means 113 and associated drive system which includes a level gear system 121, drive shaft 123, clutch means 125, truck member 127 and truck guide 129 disposed in the underside 132 of the frame member 119. A motive means 133 such as a galvanometer depends from the truck member 127 and effects the arcuate motion of the movable guide means 115 which depend from the galvanometer by the shaft 135. The frame member 119 also includes an inwardly disposed bracket member 137 having a slot 139 through which the shaft 135 extends. The slot 139 is of sufficient dimensions to permit the radial travel of the shaft 135 as effected by motive means 113 and associated components. The bracket member 137 supports a fixed guide means 141 which is shown in detail in FIG. 7. The fixed guide means 141 has a face portion 143 and a rear structural support portion 145 which is configured to facilitate radial movement of the shaft 135 as described above. A preferred configuration of the rear portion 145 includes a slotted section 147 as illustrated. The face portion 143 functions as a component orienting means, more particularly, a guide channel 149 is formed in the face portion 143. The operation of which, will be described hereinafter. The movable guide means 115 has a face portion 151 with a guide channel 153 disposed therein and can include photoemitter means 155 at the lower extremity thereof for operation as described in association with the first embodiment.

A component gripper assembly 157 is disposed between the symmetric assemblies 120 and includes fingers 159 which engage and grip the electrical component 23 to be manipulated. The fingers 159 are movable from an open position to a closed position for component acquisition and are typically pneumatically operated by a gripper piston 161. Axial movement of the gripper assembly 157 during component acquisition, alignment and insertion is also pneumatically effected in this embodiment by means of the air cylinder 163. A compliant device 165 and tactile sensor 167 are also associated with the gripper 157 as is the position sensor 169 which is sensitive to axial displacement of the gripper 157 relative to the frame member 119.

During component acquisition, the movable guides 115 are driven to a first position at the extreme end of each symmetric assembly 120 of the frame 119. The gripper assembly 157 is lowered and the fingers engage a component 23, such as the transistor illustrated in FIG. 6. As the acquired component is elevated by the gripper, the component leads are captured in the wide lower portion 171 of the channel 149 in the fixed guide 141. The compliant device permits gripper movement and rotation as necessary during component lead capture and alignment. With the gripper 157 holding the transistor 23 in the extreme, elevated position, the motive means 113 draws the movable guide means 115 into a second position adjacent the fixed guide means 115. The guide channel 153 is now aligned with the guide channel 149. The gripper assembly 157 lowers the transistor until the leads are engaged in the channel 153 of the movable guide 151. Component insertion is now carried out in substantially the same manner as previously described.

The alternative embodiment 111 demonstrates that a single motive means 113 can be utilized to effect the radial displacement of two or more symmetric assemblies. The clutch mechanism 125 can be selectively actuated to allow power transfer from the gear drive 121 to the slidable mounting means 127. Thus each assembly is individually responsive to the optical feedback system.

The use of a fixed guide means in combination with movable guide means in symmetric assemblies for two or three lead components facilitates initial orientation of the component leads and acquisition of the leads by the movable guide means 115.

What has been described is a multilead component manipulator. Although the present invention has been described with a certain degree of particularity, various modifications can be made thereto without departing from the scope of the invention as defined by the claims appended hereto.

What is claimed is:

1. A multi-lead component manipulator for printed circuit board assembly by an industrial manipulator comprising:

a frame member adapted to be mounted on said industrial manipulator;

a gripper means for engaging a component movably mounted on said frame member for axially displacing the component relative to said frame member; and at least two assemblies radially disposed about said gripper means and movably mounted on said frame member, each of said assemblies including component lead guide means for engaging a lead, first motive means for supporting said guide and effecting the arcuate motion thereof, said first motive means slidably mounted on said frame member for radial displacement relative to said gripper means, and second motive means mounted on said frame member for effecting the aforesaid radial displacement.

2. The multi-lead component manipulator of claim 1 wherein the gripper means includes means for engaging the component, third motive means for effecting the axial displacement of said engaging means for inserting the component into the circuit board, and a compliant means disposed between said engaging means and said motive means to allow flexibility of the gripper means during component insertion.

3. The multi-lead component manipulator of claim 2 wherein the at least two assemblies each include a separate second motive means for effecting the radial displacement of the slidably mounted first motive means.

4. The multi-lead component manipulator of claim 2 wherein a single second motive means is in communication with each of the slidably mounted first motive means of each assembly, whereby said single second motive means effects the radial displacement of the first motive means and wherein clutch means are associated with said second motive means for the selected actuation of said radial displacement.

5. The multi-lead component manipulator of claim 2 wherein the first motive means is a galvanometer and the second motive means is a linear displacement servometer.

6. The multi-lead component manipulator according to claim 2 wherein the frame member includes a fixed lead guide means disposed between the first motive means and the movable lead guide means, said fixed lead guide means having a face oriented toward the gripper means, said face including a channel therein for engaging the component lead as the gripper means with component is axially drawn toward the frame member, and wherein the movable lead guide means has a channel therein for engaging the component lead, said movable lead guide channel being alignable with said fixed lead guide channel whereby after said component lead is engaged by said fixed lead guide channel, said gripper means is axially displaced away from said frame member such that the component leads pass from said fixed guide channel to said movable guide channel.

7. The multi-lead component manipulator according to claim 1 including sensor means for detecting a predetermined location in the circuit board and generating an output signal reflective thereof, said output signal selectively actuating the first and second motive means whereby the engaged component leads are aligned with the predetermined location by the lead guide means and the gripper means inserts the component into the predetermined location.

8. The multi-lead component manipulator according to claim 7 wherein the sensor means for detecting a predetermined location in the circuit board and generating an output signal reflective thereof comprises an IR emitter-silicon photodiode detector circuit means which includes an emitter disposed on the movable guide means and a photodiode disposed below the circuit board in a predetermined relationship therewith so that the emitter signal passes through the circuit board component lead hole and contacts the photodiode therebelow whereby the emitter signal contacting the photodiode generates an output signal therefrom reflective of the movable lead guide location relative to the circuit board component lead hole.

9. The multi-lead component manipulator according to claim 2 including sensor means disposed between the engaging means and the motive means for generating an output reflective of forces generated between the component leads and the circuit board during insertion, the third motive means being responsive to said output.

* * * * *